Figure 1:
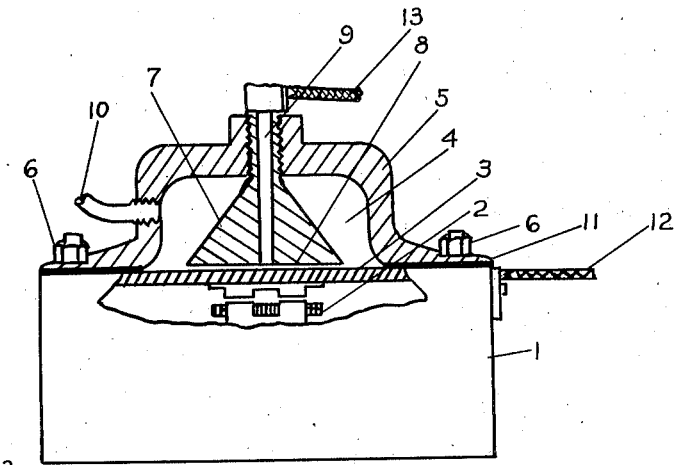

Oct. 19, 1937.   E. W. SMITH   2,096,011

METHOD AND APPARATUS FOR THE TREATMENT OF LIQUIDS

Filed Feb. 15, 1935

INVENTOR
EDWARD W. SMITH
BY
ATTORNEY

Patented Oct. 19, 1937

2,096,011

UNITED STATES PATENT OFFICE 2,096,011

METHOD AND APPARATUS FOR THE TREATMENT OF LIQUIDS

Edward W. Smith, Melrose, Mass., assignor to Submarine Signal Company, Boston, Mass., a corporation of Maine Application February 15, 1935, Serial No. 6,703

6 Claims. (Cl. 204—24)

The present invention relates to the treatment of liquids for the destruction of bacteria or other similar organisms.

Two methods of bacteria destruction which have been used in the prior art are of interest in connection with the present invention. According to one of these methods the liquid to be treated is subjected to compressional-wave vibration of great intensity. This method, if properly applied, has been found useful in producing a considerable reduction in the number of bacteria present in the liquid.

According to the other method, which is perhaps best known by the term "catadyne process", a dispersion of an oligodynamic and catalytic substance, such as silver or other heavy metal, is introduced into the liquid to be treated. Positively charged silver ions are by this means introduced into the liquid and presumably are attracted to the negatively charged bacteria which thereupon are destroyed. Just what causes the killing of the bacteria is not definitely known, but it may be that this is due to the neutralization of the negative charge on the bacteria, preventing the latter from absorbing food, or in some other way upsetting the equilibrium and the life process of the bacteria.

In carrying out this method the silver ions are produced in the solution by placing the liquid to be treated between two electrodes supplied from a direct current source. One of these electrodes is made of silver or other oligodynamic or catadynamic material and is the anode. The material of which the cathode is made does not appear to be of great importance. Now with this method some difficulty has been encountered due to the fact that the silver anode becomes coated with dissociation products which prevent or inhibit the ionization of further silver. This has been to some extent alleviated by providing scraping or scrubbing devices which assist in keeping the electrode clean.

According to one feature of the present invention the anode in a catadyne system is vibrated by means of an acoustic vibrator whereby the coating of the anode by dissociation products of the electric current in the liquid is prevented.

According to a still further feature of the present invention the liquid to be treated is subjected not only to catadyne action, but also to intense compressional-wave vibration concurrently. By the combined simultaneous application of catadyne action and compressional-wave vibration, a much more effective destruction of bacteria is obtained than when either method is used separately. Apparently the compressional-wave vibration assists and accelerates the catadyne action. The action of the compressional waves may also produce a substantial increase in the solution pressure and in this manner accelerate the catadyne action. On the other hand, the improved result may be due to the fact that after the negatively charged bacteria come into contact with the positively charged oligodynamic metal ion, they are in a state where they are easily destroyed by intense compressional-wave energy.

In the treatment of liquids according to the present invention the liquid may either be treated by the flow method in which a continuous stream is allowed to flow through the region where the action takes place, or the liquid may be treated for a continued length of time by the so-called batch process, the liquid being removed after the treatment is complete.

In the use of the flow method the liquid may be conducted between two oppositely charged surfaces, at least one of which, preferably the anode, is in rapid vibration. In treating the liquid by the batch process, at least one of the electrodes, usually the anode, may be set into rapid motion as by means of an electromagnetic vibrator in order to prevent the accumulation of undesirable substances on the electrode surface. On the other hand, the electrode may be so designed that when set into vibration as by an electromagnetic or electrodynamic oscillator, compressional-wave vibrations are set up in the liquid which assist the catadyne action.

Instead of using silver as the active oligodynamic electrode platinum may be used to advantage. Silver, being a bivalent metal, has two positive electric charges on its ions which are available for the neutralization of the negative charges on the bacteria, where platinum, being a quadrivalent metal, has four positive electrical charges on its ions. The use of platinum, therefore, results in bringing about a bacteriacidal action equivalent to that brought about by the use of silver but does so with a cation concentration substantially below that required with silver which is obviously advantageous.

Figure 2:
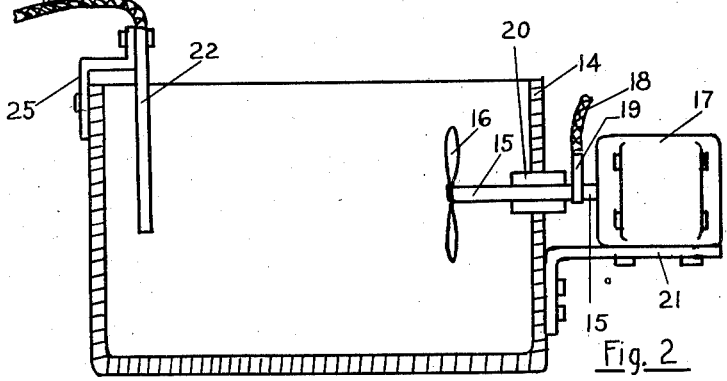
Figure 3:
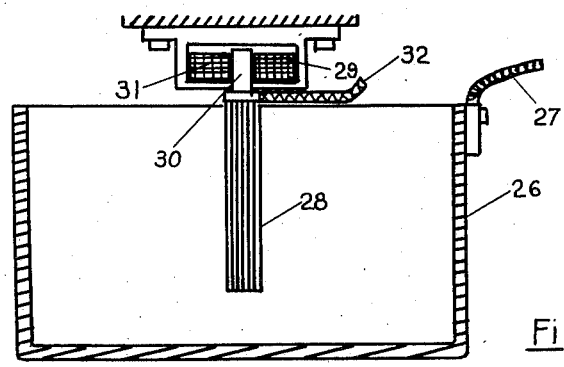

The present invention will be more fully understood in connection with the following description taken in consideration with the drawing in which Fig. 1 shows the invention as applied to a continuous flow system; Fig. 2 shows a modification indicated in Fig. 1; and Fig. 3 shows a still further modification.

In Fig. 1, I represents the oscillator which may be of the electromagnetic type excited by the electromagnet 2 which vibrates the diaphragm 3. Above the diaphragm there is formed a chamber 4 by means of the cover 5 which is held to the oscillator through bolts 6, 6. A nozzle 7 is suspended from the top of the chamber and is provided with a lower face 8 positioned just above the diaphragm 3. The center of the nozzle is provided with an opening 9 by which the fluid may be conducted to the inside of the chamber.

Another conducting pipe 10 is connected to the chamber 4 so that the liquid may enter at one pipe and be drawn off at the other, that is the liquid may enter at 9 and be drawn off at 10, or vice versa. The cover 5 may be insulated from the diaphragm 3 of the oscillator by means of an insulating ring 11 and the diaphragm itself may be made the anode of the system by means of the conductor 12 while the face 8 of the nozzle may be made the cathode by the conductor 13.

In the treatment of such liquids as milk, for instance, the whole milk may be allowed to flow through the pipe 10 between the diaphragm and the nozzle 7 and then out through the pipe 9. During this flow the diaphragm 3 may be continually vibrated and at the same time current may be applied between the diaphragm and the face 8 of the nozzle. In order to produce the most desirable effect the diaphragm is plated with silver and so also the face of the nozzle. While silver is preferably used, copper or other metals that have the desired action may be substituted.

In Fig. 2 a modification of the device indicated in Fig. 1 is shown. Here a tank 14 is provided in which the liquid may be placed. Through the wall of the tank may be inserted a shaft 15 carrying at the end a propeller 16 or other rotatable device. The shaft and propeller are operated through the motor 17. The propeller 16 may be made the anode through properly polarizing the conductor 18 which has at its end a brush 19 resting against the shaft 15. A suitable bearing 20 may be provided in the wall of the tank to properly support the shaft 15, and the motor 17 may similarly be supported to the tank through the bracket 21.

The cathode electrode 22 is suspended in the tank preferably at the opposite end although it may be placed in the middle if desired. The electrode 22 is supplied with current through the conductor 23 and the electrode itself may be supported by an insulating support 25 from the side wall of the tank.

In the modification shown in Fig. 3 the tank 26 may be made the negative electrode by means of the conductor 27 connected to the side of the tank. The positive electrode may be a fluted rod 28 or any other suitable means to which current is supplied through the conductor 32. The rod 28 may be vibrated by means of an oscillator 29 in which the oscillating armature 30 may be directly coupled to the rod 28 and energized by means of the coil 31. Any other suitable method of vibrating the rod 28 may be provided as, for instance, by magnetostriction or by mechanical or dynamical methods. The rod 28 is fluted to provide a larger surface area.

The electrodes which should be of a suitable metal may be, as has been stated, either heavily plated or entirely constructed of the metal. It may be desirable to separate the silver or other salts that may be formed by electrolytic action. These may be filtered out or special means provided to absorb them or eliminate them from the solution after it has been treated.

Having now described my invention, I claim:

1. An apparatus for treating milk or liquids which comprises an oscillator having a diaphragm at one side thereof, a chamber formed over said diaphragm, said chamber having inlet and outlet means and means for charging the diaphragm positively, said diaphragm being insulated from the chamber and having a silver surface.

2. Means for treating a liquid or the like comprising an oscillator having a diaphragm at one side thereof, a chamber formed over said oscillator, means forming a surface parallel and close to said oscillator, said means having a central opening, means forming said diaphragm as a positive electrode of a circuit and the surface opposite thereof as a negative electrode, said positive electrode having a silver surface.

3. A method of treating milk which comprises flowing the milk between two surfaces forming a narrow chamber, supplying during the flow compressional wave energy to one of the surfaces and simultaneously therewith maintaining the surfaces charged to opposite electrical potentials.

4. A method of treating milk which comprises flowing the milk between two surfaces forming a narrow channel, one surface of which supplies a positive electrode of silver, supplying compressional wave energy to said surface and simultaneously maintaining the opposed surface charged to a negative potential.

5. A method of treating milk which comprises flowing the milk between two surfaces forming a narrow channel, one of the surfaces supplying a positive electrode of silver and the other surface a corresponding negative electrode and supplying compressional wave energy to said surfaces.

6. An apparatus for treating milk or other liquids comprising a diaphragm, means for vibrating the diaphragm, means forming a chamber over said diaphragm having an element providing a flat surface substantially parallel with the diaphragm surface, means adapted to establish potential differences between the opposite surfaces and inlet and outlet means to said chamber.

EDWARD W. SMITH.